(12) United States Patent
Dahlman et al.

(10) Patent No.: US 7,227,850 B2
(45) Date of Patent: Jun. 5, 2007

(54) CELLULAR RADIO COMMUNICATION SYSTEM WITH FREQUENCY REUSE

(75) Inventors: Erik Dahlman, Bromma (SE); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1012 days.

(21) Appl. No.: 09/825,353

(22) Filed: Apr. 4, 2001

(65) Prior Publication Data
US 2002/0145988 A1    Oct. 10, 2002

(51) Int. Cl.
*H04Q 7/00*     (2006.01)
*H04Q 7/20*     (2006.01)
*H04B 7/216*    (2006.01)
*H04J 1/00*     (2006.01)

(52) U.S. Cl. .............. 370/330; 370/335; 370/343; 455/447; 455/453

(58) Field of Classification Search ............ 370/335, 370/342, 329, 331, 330, 315, 316, 208, 426, 370/432, 441, 320, 341; 455/447, 450, 452.1, 455/62, 63, 436, 422.1, 442, 448, 446, 453
See application file for complete search history.

(56) References Cited

U.S. PATENT DOCUMENTS

| | | | |
|---|---|---|---|
| 6,243,584 B1 * | 6/2001 | O'Byrne ................ 455/447 |
| 6,317,412 B1 * | 11/2001 | Natali et al. ........... 370/208 |
| 6,356,531 B1 * | 3/2002 | Soliman ................ 370/241 |
| 6,385,188 B1 * | 5/2002 | Kim et al. ............. 370/342 |
| 6,438,115 B1 * | 8/2002 | Mazur et al. .......... 370/330 |
| 6,512,752 B1 * | 1/2003 | H'mimy et al. ........ 370/329 |
| 6,556,829 B1 * | 4/2003 | Persson ................ 455/437 |
| 6,744,743 B2 * | 6/2004 | Walton et al. ......... 370/318 |
| 6,813,254 B1 * | 11/2004 | Mujtaba ................ 370/335 |
| 6,823,170 B1 * | 11/2004 | Dent ..................... 455/13.3 |
| 6,845,238 B1 * | 1/2005 | Muller ................... 455/436 |
| 6,888,805 B2 * | 5/2005 | Bender et al. ......... 370/314 |
| 6,892,068 B2 * | 5/2005 | Karabinis et al. ..... 455/429 |
| 6,898,431 B1 * | 5/2005 | Peele .................... 455/453 |

OTHER PUBLICATIONS

Hamidian, K., et al. Performance Analysis of a CDMA/FDMA Cellular Communication System with Cell Splitting, IEEE, 1997, pp. 545-550.
Kim, Won, S., et al., "Enhanced Capacity in CDMA Systems with Alternate Frequency Planning," IEEE, 1998, pp. 973.
International Preliminary Examination Report PCT/SE02/00586.

* cited by examiner

Primary Examiner—Hanh Nguyen
(74) Attorney, Agent, or Firm—Nixon & Vanderhye P.C.

(57) ABSTRACT

Different frequency reuse values are associated with different channels, e.g., different types of channels in a cellular communications system. For a high speed downlink shared type of channel, the frequency reuse may be greater than one in order to achieve higher data rates. On the other hand, the frequency reuse may be set to one for other channel types, e.g., dedicated channels including both uplink and downlink dedicated channels. Alternatively, the frequency reuse may also be set greater than one for channels in addition to the downlink shared channel, e.g., one or more dedicated downlink channels, while a frequency reuse of one is deployed for one or more uplink dedicated channels. Using different frequency reuse values reduces inter-cell interference, particularly at cell borders, while still maintaining existing soft handover schemes for dedicated channels if one or more of the channels is a code division multiple access (CDMA) type of channel.

30 Claims, 11 Drawing Sheets

HS-DSCH + Uplink (UL) and Downlink (DL) dedicated channels (DPCH)

Two terminals with different downlink carriers but sharing one uplink carrier

Different reuses for HS-DSCH vs. other channels.

Different reuses for HS-DSCH vs. other channels.

CELLULAR RADIO COMMUNICATION SYSTEM WITH FREQUENCY REUSE

FIELD OF THE INVENTION

The present invention relates to radio communications, and more particularly, to enhancing flexibility and services of a Code Division Multiple Access radio communication system.

BACKGROUND AND SUMMARY OF THE INVENTION

In order to increase the capacity of a cellular radio communications network, different access strategies may be employed. Rather than assigning a particular frequency bandwidth to a single radio communication as in Frequency Division Multiple Access (FDMA)-based systems, time division multiplexing may be employed as in Time Division Multiple Access (TDMA)-based systems to increase the number of user communications that use the same frequency bandwidth. Multiple users transmit on the same frequency bandwidth, but at a different time. In Code Division Multiple Access (CDMA), multiple users share the same frequency bandwidth, but each radio communication is assigned a different spreading code used by a receiver to extract the desired information.

As third generation CDMA-based mobile radio communication systems like wideband CDMA and CDMA 2000 evolve, they may incorporate time division multiplex principles along with code division multiplexing. For example, a shared channel may be employed primarily for downlink (from base station-to-mobile station) packet data transmissions, i.e., a High Speed-Downlink Shared Channel (HS-DSCH). Such a high speed downlink shared channel corresponds to downlink spreading codes shared by mobile users on a time division multiplexed basis. For a particular time interval, the entire set of HS-DSCH spreading codes is used for downlink transmission to a single mobile terminal. In the example illustrated in FIG. 1, there are five spreading codes (SC) allocated to the HS-DSCH corresponding to $SC_1$–$SC_5$. The use of these five spreading codes is decided on a timeslot basis. Data to a first mobile terminal MT#1 is transmitted during timeslot TS1 employing all five spreading codes $SC_1$–$SC_5$. At timeslot TS2, all five spreading codes are employed to transmit data to the mobile terminal MT#2. At timeslot T3, all five spreading codes are used to transmit data to the mobile terminal MT#3. While this pattern may repeat itself, this need not be the case. For example, timeslots TS4 and TS6 could be used to send data to MT#1, and timeslot TS5 could be used to send data to MT#2.

In addition to sharing resources using time division multiplexing, high speed shared channel resources may also be shared by mobile users using Code Division Multiplexing (CDM). For a given time interval in CDM, data to multiple mobile terminals may be transmitted in parallel using different subsets of the spreading codes allocated to the high speed shared channel in addition to time division multiplexing. Referring to FIG. 2, during timeslot TS1, data to the mobile terminal MT#1 is transmitted using all five spreading codes. However, during timeslots TS2 and TS3, two spreading codes $SC_1$–$SC_2$ are used to transmit data to the mobile terminal MT#2, and spreading codes $SC_3$–$SC_5$ are used to send data to the mobile terminal MT#3. Similar to the pure TDM case, as described in the previous paragraph, this pattern may or may not repeat itself. For example, timeslots TS4 and TS6 could be used to allocate all five spreading codes to send data to MT#1, and timeslot TS5 could be used to send data to MT#1 using $SC_1$–$SC_2$ and data to MT#3 using $SC_3$–$SC_5$.

One issue regarding such a high speed downlink shared channel is how to offer satisfactory quality of service to all mobile terminals in the cell. Radio channel conditions vary dramatically and quite rapidly. It may be advantageous not to try to adjust the transmit power on the high speed downlink shared channel to compensate for quickly varying channel conditions. (It still may be desirable to adjust the transmit power for other reasons, e.g., to vary the fraction of the total downlink cell capacity allocated for high speed downlink shared channel transmission.) Instead of transmit power adjustment, the modulation and/or coding scheme used on the high speed downlink shared channel may be varied to adapt the high speed downlink shared channel transmission to varying channel conditions. This is referred to as adaptive modulation and coding (AMC). By varying the modulation and/or coding scheme, the high speed downlink shared channel data rate may be varied. For mobile terminals experiencing favorable conditions, e.g., the mobile terminal is close to the base station, higher order modulation, e.g., 16 QAM, and higher rate coding, e.g., $R=\frac{3}{4}$, may be used. Similarly, for mobile terminals experiencing less favorable positions, e.g., the mobile terminal is close to the cell border, lower order modulation, e.g., QPSK, and lower rate coding, e.g., $R=\frac{1}{4}$, might be used. Thus, mobile terminals experiencing favorable positions can be offered higher data rates, i.e., higher quality of service (QoS), while mobile terminals experiencing less favorable positions can be offered lower data rates, i.e., lower quality of service.

Each mobile terminal that may receive downlink packet data on the high speed downlink shared channel (HS-DSCH) may also communicate with the base station using a pair of associated uplink (UL) and downlink (DL) dedicated physical channels, i.e., UL DPCH and DL DPCH. The associated uplink and downlink dedicated physical channels correspond to uplink and downlink dedicated spreading codes. In contrast to an AMC-based approach for the high speed shared channel, "fast" power control is typically employed in existing CDMA systems to control the transmit power of CDMA signals. Fast power control should also be used to control the transmit power on dedicated channels, including downlink dedicated channels associated with the high speed downlink shared channel, in order to compensate for quickly varying channel conditions. That fast power control is usually implemented gradually using small, incremental (+/−) power control commands. The power control command that controls the transmit power of the downlink dedicated channel is carried on the uplink dedicated channel and vice versa.

In addition to carrying power control commands for downlink dedicated channels, an uplink dedicated channel may be used for uplink control signaling related to the high speed downlink shared channel, e.g., estimates of the downlink channel quality. Such HS-DSCH quality estimates may be used, for example, by the base station to select the high speed downlink shared channel modulation and/or coding scheme. The uplink dedicated channel may also carry other types of services such as speech. Similarly, the downlink dedicated channel may carry other services such as speech as well as downlink signaling information related to the high speed downlink shared channel. For example, such control signaling may indicate that data for a specific mobile terminal is being transmitted on the high speed shared channel along with information about certain transmission parameters such as a modulation and/or coding scheme to be used on the high speed shared channel. FIG. 3 illustrates an approach where each of four mobile terminals ($MT_1$–$MT_4$) is allocated its own dedicated uplink and downlink signaling channels. However, all mobile terminals may use a single downlink shared data channel, where sharing may be accomplished using time division multiplexing and/or code division multiplexing as described above. FIG. 4 illustrates these shared and dedicated channels with more specific labels. Instead of transmitting all downlink signaling related to the high speed shared channel on an associated downlink dedicated channel, some of the downlink signaling may be transmitted on an associated shared signalling channel (not illustrated in FIGS. 3 and 4).

CDMA-based systems are typically deployed with a one-to-one correspondence between uplink and downlink carrier frequencies ($f_{DL,1} \leftrightarrows f_{UL,1}$; $f_{DL,2} \leftrightarrows f_{UL,2}$, etc.). However, it is likely that, in the future, more spectrum will be allocated for the downlink compared to that allocated for the uplink because there will be larger volumes of downlink traffic than uplink traffic, e.g., high speed multimedia services like downloading web page information to a mobile terminal. FIG. 5 illustrates frequency spectrum as trapezoids with multiple downlink carriers ($f_{DL,1}$; $f_{DL,2}$) sharing a single uplink carrier ($f_{UL}$). Different downlink carriers may support different types of services. As illustrated in FIG. 6, one downlink carrier may carry only speech ($f_{DL,1}$), and one downlink carrier may only carry packet data ($f_{DL,2}$). Both downlink carriers could share the same uplink carrier ($f_{UL}$) to carry a variety of uplink information including uplink speech, uplink packet data, uplink control signaling associated with the high speed downlink transmission, etc. One reason to separate different types of services on different carriers is that different services may have very different characteristics. As an example, a speech service may be more sensitive to interference as compared to a packet data service. Thus, a packet-data carrier can be loaded with more traffic compared to the case when the carrier is also carrying speech services.

Frequency reuse is a defining characteristic of cellular systems. In frequency reuse, the same carrier frequencies are used in multiple, geographically different areas for which the system provides coverage. Significantly, these areas are separated from one another by a sufficient distance so that any co-channel or adjacent channel interference is less than a particular threshold. FIG. 7A shows a cellular system with a frequency reuse of one, i.e., the same carrier frequency $f_1$ is used in all cells. This is the case in CDMA-based cellular systems like CDMA 2000 and wideband CDMA. A frequency reuse of one means that the entire available frequency band is available in each cell. The entire available frequency band is represented symbolically in FIG. 7A as $f_1$. However, that frequency band could be divided into, e.g., three subbands $f_1$, $f_2$, and $f_3$, and in that case, every cell transmits over all three subbands.

The problem with a frequency reuse of one is the high level of inter-cell interference, i.e., interference originating from neighbor cells. To reduce inter-cell interference, FDMA and TDMA cellular systems typically use a frequency reuse greater than one, which means that neighboring cells use different carrier frequencies. FIG. 7B shows an example frequency reuse equal to three. Both of the examples of FIG. 7A and FIG. 7B are somewhat simplified in the sense that the uplink and the downlink typically use different carrier frequencies. Thus, $f_1$ may be interpreted as a pair of frequencies [$f_{UL,1}$, $f_{DL,i}$].

For a CDMA system that employs a high speed downlink shared channel, a frequency reuse of one leads to large variations in the channel quality, (measured, for example, in terms of signal-to-interference ratio (SIR)), between different positions in a cell. Larger variations in channel quality may result from higher levels of downlink interference that may be present in the cell, especially close to the cell border. As described above, using adaptive modulation and/or coding, the data rate of the high speed downlink shared channel depends on the channel quality, e.g., the detected SIR. Thus, with a frequency reuse equal to one, there may be large variations in the high speed downlink shared channel services offered to different mobile terminals, depending on their position in the cell. Mobile terminals close to the cell site and far from the cell border may experience high downlink signal-to-interference ratios, allowing for high data rates on the HS-DSCH. Mobile terminals close to the cell border may well experience lower, downlink signal-to-interference, allowing only low data rates on the downlink channel. A reuse of greater than one results in less inter-cell interference at the cell border, improves channel quality, and accordingly, allows for significantly higher data rates at the cell border over the high speed downlink shared channel.

Although there is a benefit in terms of lower inter-cell interference, and thus improved services for mobiles at cell borders achieved by employing a frequency reuse greater than one for a CDMA-based system, there are certain disadvantages with using a frequency reuse greater than one in a CDMA-based cellular system. If the total available uplink spectrum is less than the total available downlink spectrum, as illustrated in the example of FIG. 6 above, there may not be enough uplink spectrum to support a frequency reuse greater than one on the uplink. One solution to this problem is to use a frequency reuse equal to one for the uplink, i.e., uplink communication is performed on the same carrier frequency $f_{UL}$ in all cells. At the same time, a frequency reuse greater than one is used for the downlink, i.e., downlink communication is performed on different carriers in neighbor cells. However, this solution causes a problem related to soft handover.

Soft or diversity handover is readily supported in CDMA systems where the frequency reuse is one. Soft handover is typically used in a CDMA system with an uplink a frequency reuse of one, in order to avoid excessive uplink interference and significant capacity loss. In soft handover, an uplink transmission from a mobile station is received by multiple neighbor base stations, e.g., base stations in a so-called "active set." In addition, all base stations in the active set transmit on the downlink to the mobile station. Each of the power control commands transmitted from all base stations in the active set is considered by the mobile station when it regulates its uplink transmit power. Mobile uplink transmissions are usually simultaneously power controlled from all base stations in the active set in such a way that if any of the base stations requests a reduction in power, the mobile terminal transmit power is reduced. The mobile terminal transmit power is only increased if all base stations in the active set request an increase of the transmit power. If a frequency reuse equal to one is used on the downlink, the mobile terminal only has to receive a single carrier frequency to receive the power control command signals from all of the base stations in the active set.

If there are multiple carrier frequencies in a system with a frequency reuse greater than one for the downlink, the task of receiving power control commands from the active set of base stations is more complicated. The mobile terminal must be able to receive and process simultaneously the same signals on different frequency carriers. Because this is complicated and requires a multi-carrier receiver in the mobile terminals, in practice, soft handover is easier to implement when the downlink frequency reuse is one. In addition, the ability to perform soft handover associated with a frequency reuse of one is beneficial for some services like speech in both uplink an downlink directions. Soft handover permits seamless handover between base stations, leading to improved quality of service.

The present invention resolves these competing interests with respect to frequency reuse in a CDMA-based mobile communication system (although it is not limited to CDMA systems). Different frequency reuse values are associated with different channels in a cellular communications system, e.g., different types of channels. For a high speed downlink shared type of channel, the frequency reuse may be greater than one in order to achieve higher data rates. On the other hand, the frequency reuse may be set to one for other channel types, e.g., dedicated channels including both uplink and downlink dedicated channels. Alternatively, the frequency reuse may also be set greater than one for channels in addition to a downlink shared channel, e.g., one or more dedicated downlink channels, while a frequency reuse of one is deployed for one or more uplink dedicated channels. Using different frequency reuse values reduces inter-cell interference, particularly at cell borders, while still maintaining existing soft handover schemes for dedicated channels if one or more of the channels is a CDMA channel.

BRIEF DESCRIPTION OF THE DRAWINGS

The foregoing and other objects, features, and advantages of the invention will be apparent from the following description of preferred, non-limiting example embodiments, as well as illustrated in the accompanying drawings. The drawings are not to scale, emphasis instead being placed upon illustrating the principles of the invention.

DETAILED DESCRIPTION

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. In some instances, detailed descriptions of well-known methods, interfaces, devices and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an Application Specific Integrated Circuit (ASIC), and/or using a Digital Signal Processor (DSP).

Figure 1:
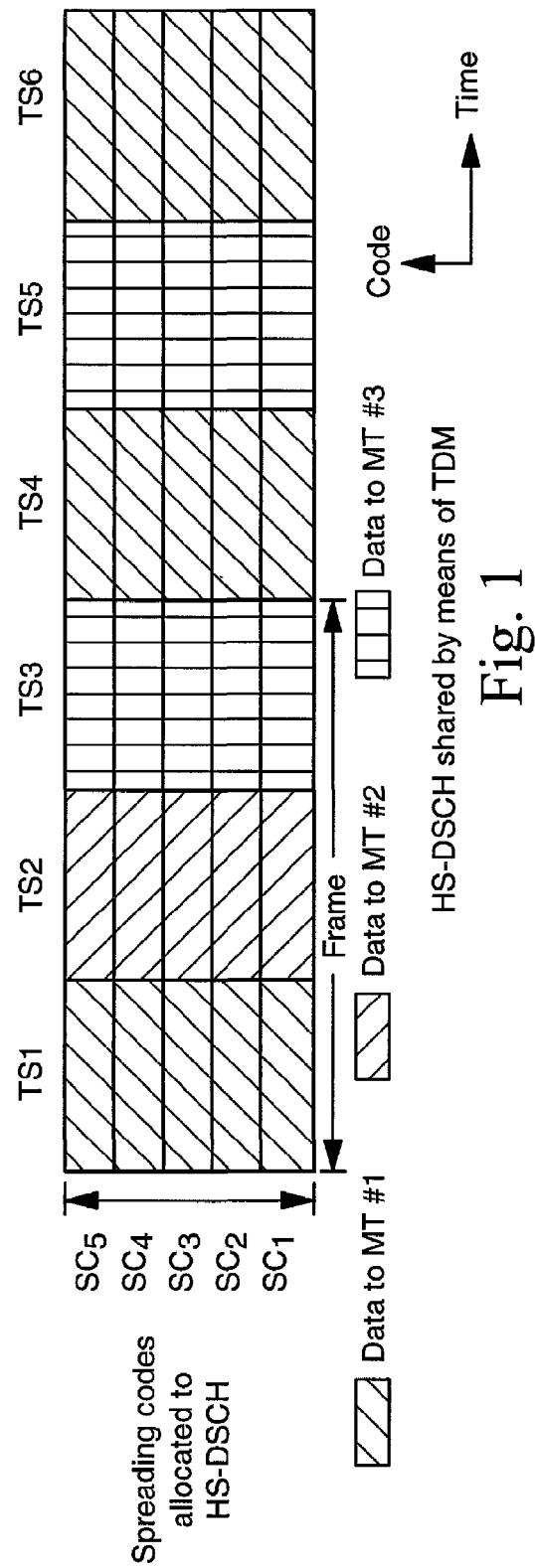
FIG. 1 illustrates time division multiplexing principles for a high-speed shared channel in a CDMA system
Figure 2:
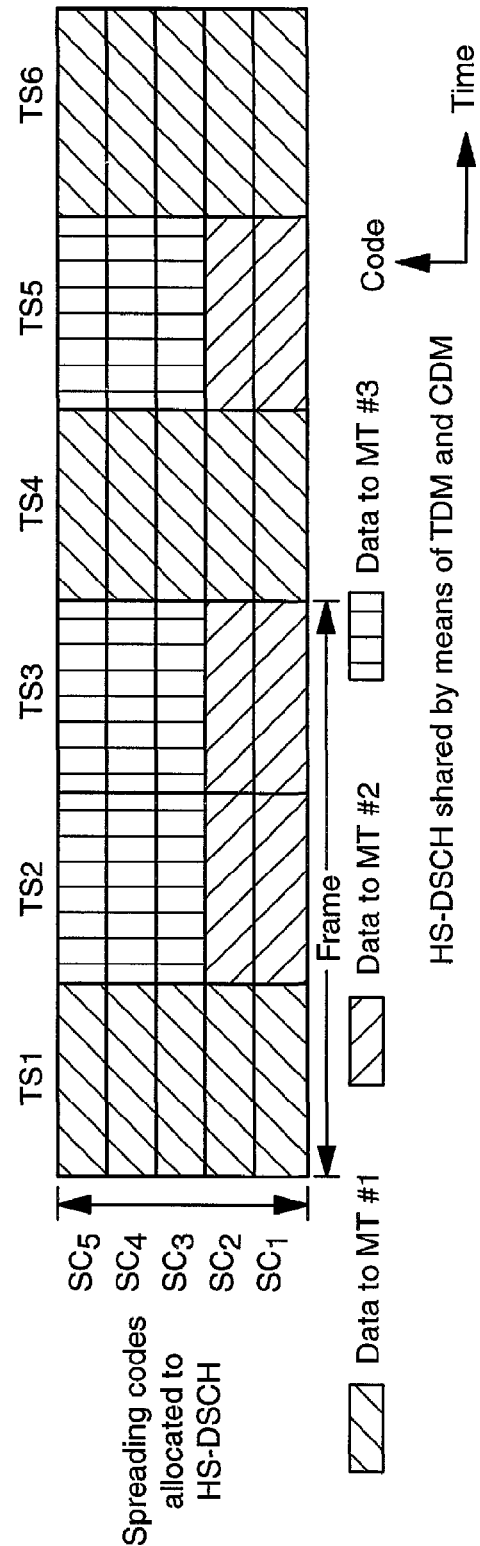
FIG. 2 illustrates using code division multiplexing incorporated along with time multiplexing for a high speed dedicated shared channel.
Figure 3:
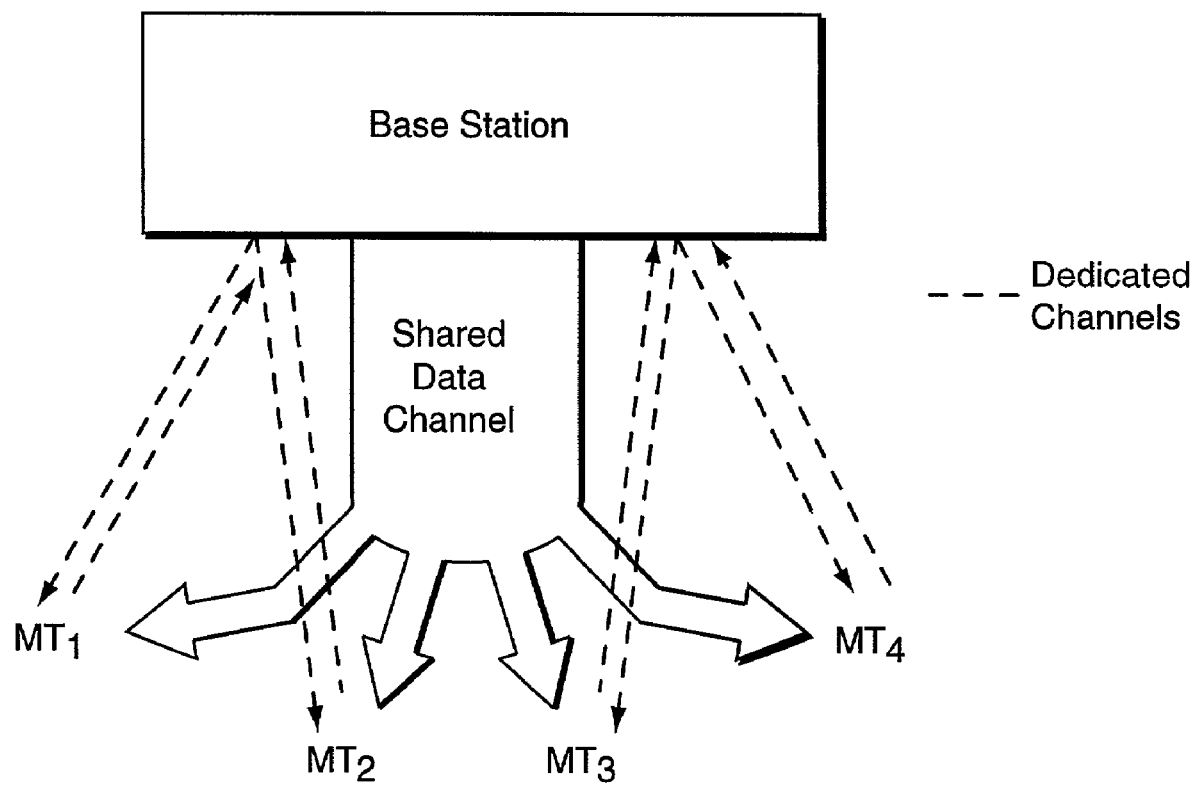
FIGS. 3 and 4 illustrate a high speed downlink shared channel with associated uplink and downlink dedicated physical channels.
Figure 4:
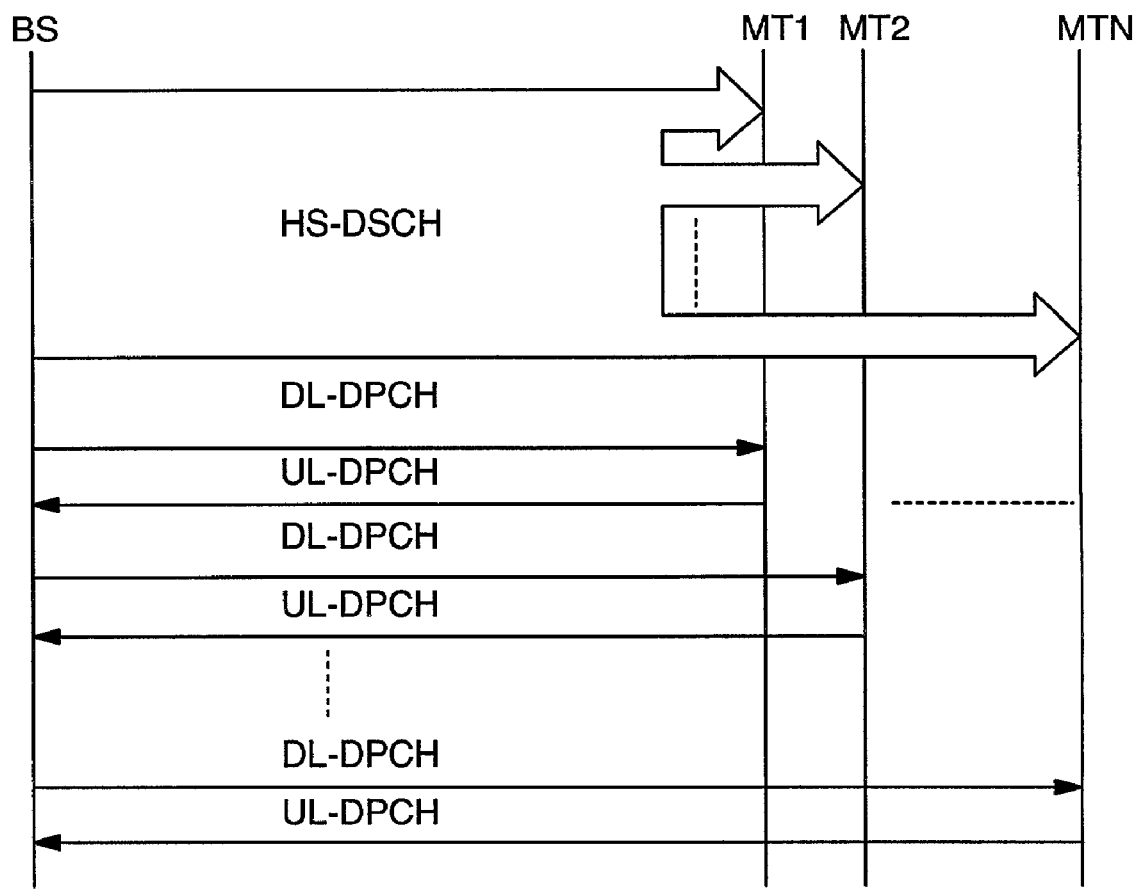
Figure 5:
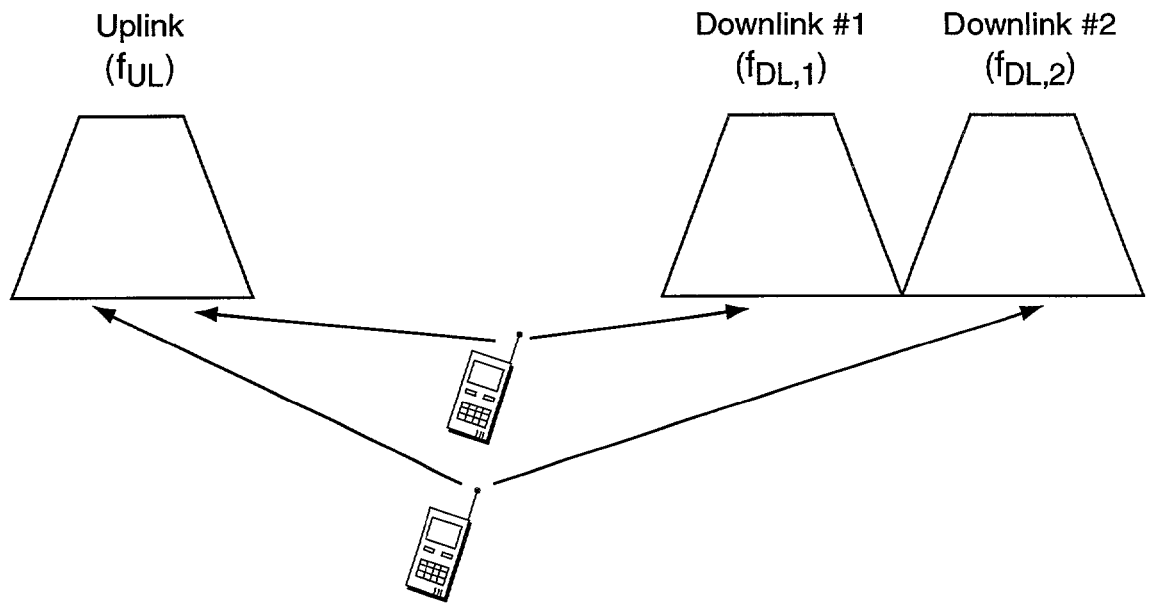
FIGS. 5 and 6 illustrate different frequency spectrum allocations for uplink and downlink channels.
Figure 6:
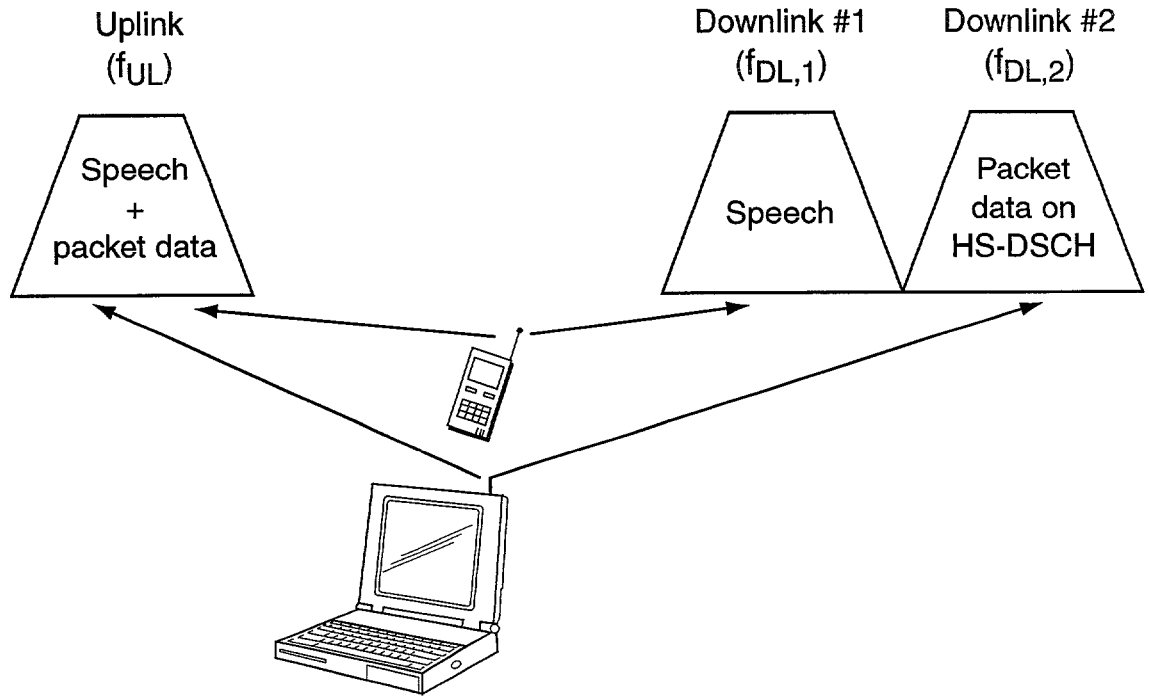
Figure 7A:
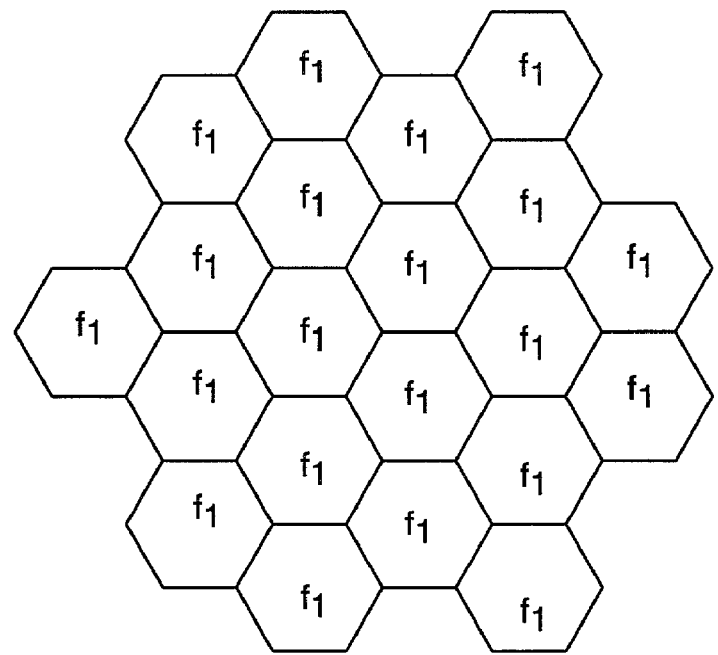
FIGS. 7A and 7B show cellular systems with different frequency reuse schemes.
Figure 7B:
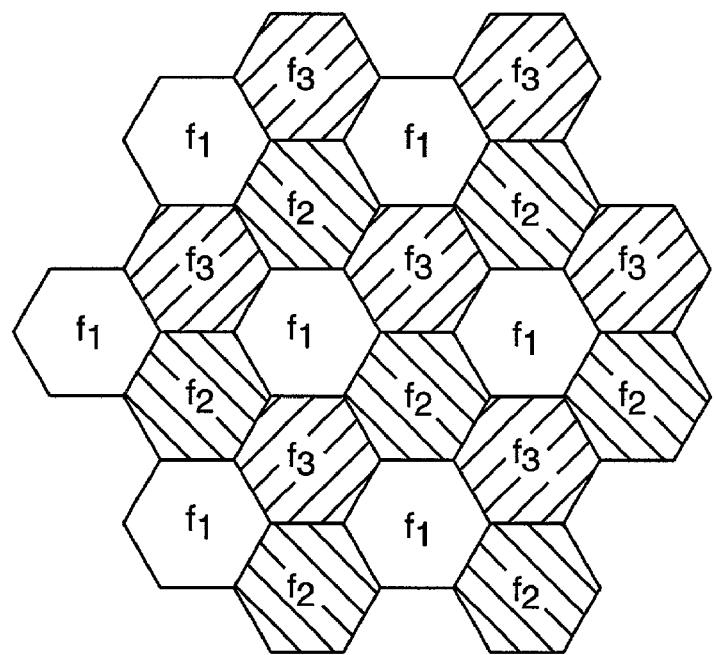
Figure 8:
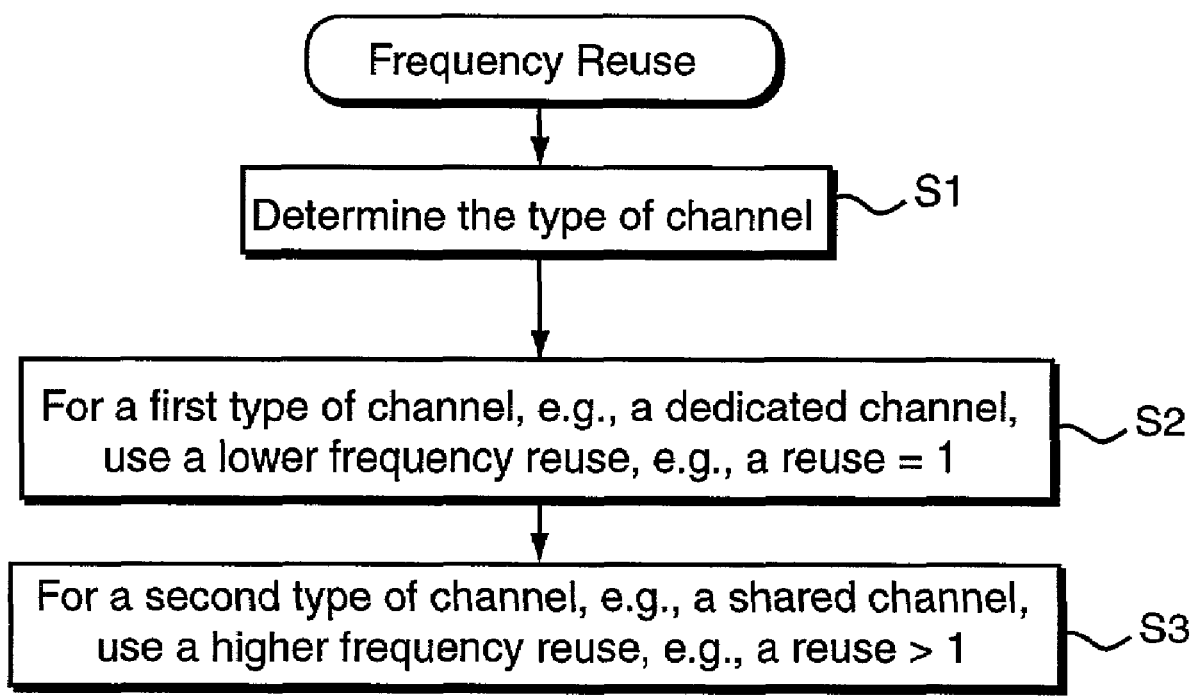
FIG. 8 illustrates a frequency reuse deployment method in accordance with one example implementation of the present invention.

An example of a frequency reuse deployment method in accordance with the present invention is now described in the context of the flowchart diagram shown in FIG. 8. Initially, a type of channel is determined (in step S1). For a first type of channel, e.g., a dedicated or shared channel, an uplink or downlink channel, or other category of channel, a lower frequency reuse value is employed (step S2). In the example of a dedicated type of channel, it may be desirable to employ a frequency reuse equal to one in order to obtain the benefits of soft handover. For a second type of channel, a higher frequency reuse may be employed, e.g., a reuse greater than one (step S3). A higher frequency reuse value is advantageous because it reduces inter-cell interference and provides better service for mobile terminals especially close to the cell borders.

Figure 9:
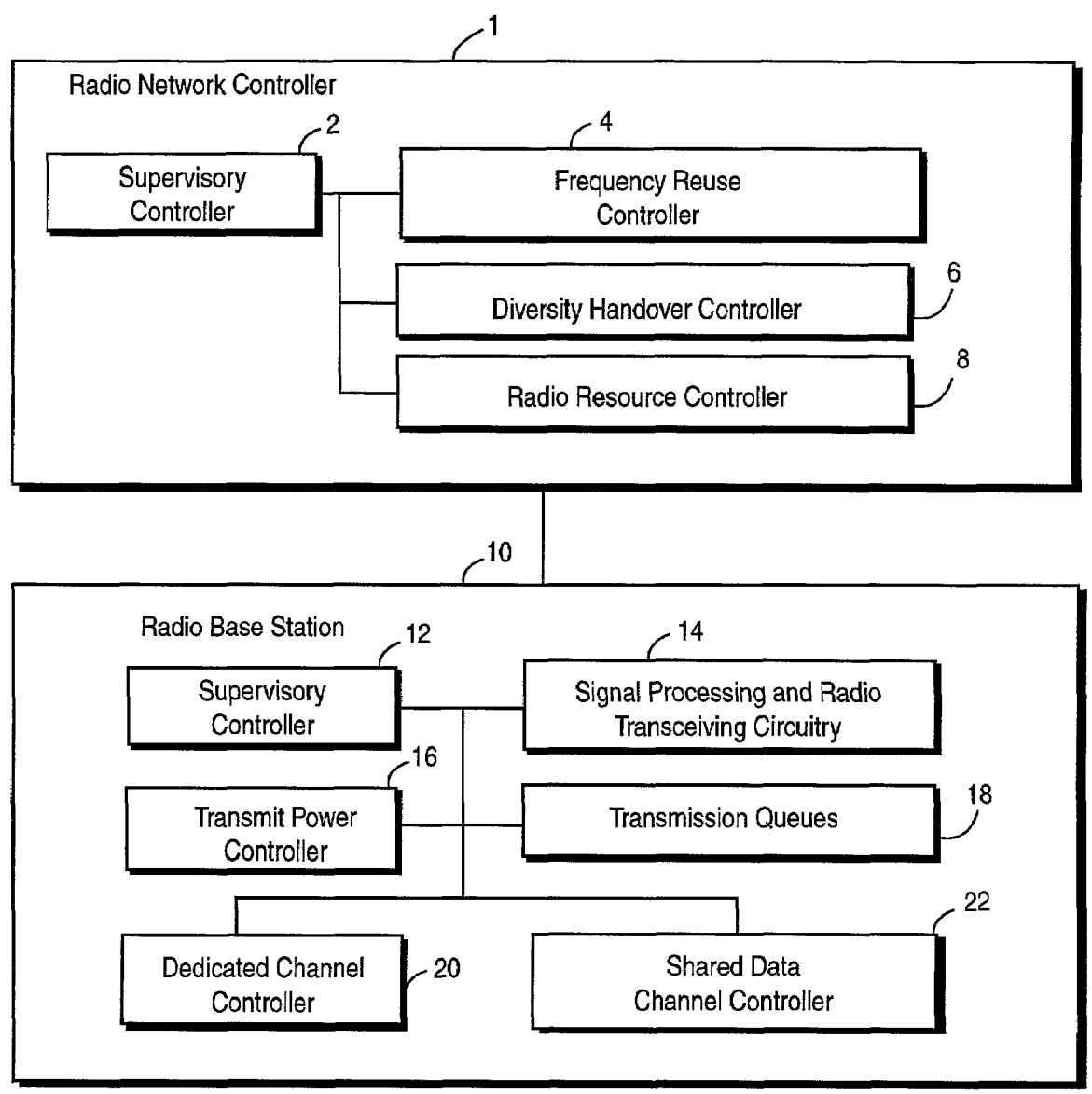
FIG. 9 illustrates simplified function block diagrams of a radio network controller coupled to a radio base station.

The example frequency reuse deployment method illustrated in FIG. 8 may be implemented in the radio network controller node 1 illustrated in function block format in FIG. 9. Of course, the frequency reuse deployment may also be performed by other apparatus either within the radio access network, the core network, or by some external device used in cell planning. This frequency reuse deployment may be performed at system setup or configuration. Of course, that reuse may be changed if requirements or objectives change. The radio network controller 1 includes a supervisory controller 2 coupled to a frequency reuse controller 4, a diversity handover controller 6, and a radio resource controller 8. The supervisory controller 2 controls the overall operation of the radio network controller 1 and performs communication interface functions with other nodes including the radio base station 10, other RNCs, and/or core network nodes. The frequency reuse controller 4 implements frequency reuse deployment in accordance with the present invention. The diversity handover controller 6 orchestrates diversity handover for mobile connections. The radio resource controller 8 allocates and manages the radio resources for various connections for which the radio network controller 1 has responsibility.

The radio base station 10 also shown in FIG. 9 includes a supervisory controller 12 that controls and/or coordinates signal processing and radio transceiving circuitry 14, transmit power controller 16 for controlling the transmit power of the transmitter portions of the radio transceiving circuitry, and transmission queues 18 for storing data packets to be transmitted to or received from various user equipment terminals. In addition, the supervisory controller 12 controls and/or coordinates the functions of a dedicated channel controller 20 and a shared data channel controller 24. The dedicated channel controller 20 establishes dedicated signaling communications with user equipment/mobile terminals via dedicated physical radio channels (DPCH). Signaling information pertaining to obtaining information from the high speed-downlink data channel shared by the multiple user equipment terminals may also be transmitted over downlink dedicated channels. Example signaling information may include: (1) information identifying which user equipment terminal's data will be transmitted on the high speed shared data channel during a particular time interval, (2) a particular set of high speed shared data channel spreading codes to be used for data transmission to a specific user equipment terminal over the high speed downlink shared data channel during a particular time interval, (3) information identifying a particular coding and/or modulation scheme used for data transmission on the downlink shared data channel to a specific user equipment terminal during each corresponding time, and (4) sequence numbering for data packets to be transmitted to a specific user equipment terminal on the downlink shared data channel during corresponding time intervals. The shared data channel controller 22 is responsible for transmitting data packets during specific time intervals in accordance with the corresponding signaling information relevant to that current time interval.

Figure 10:
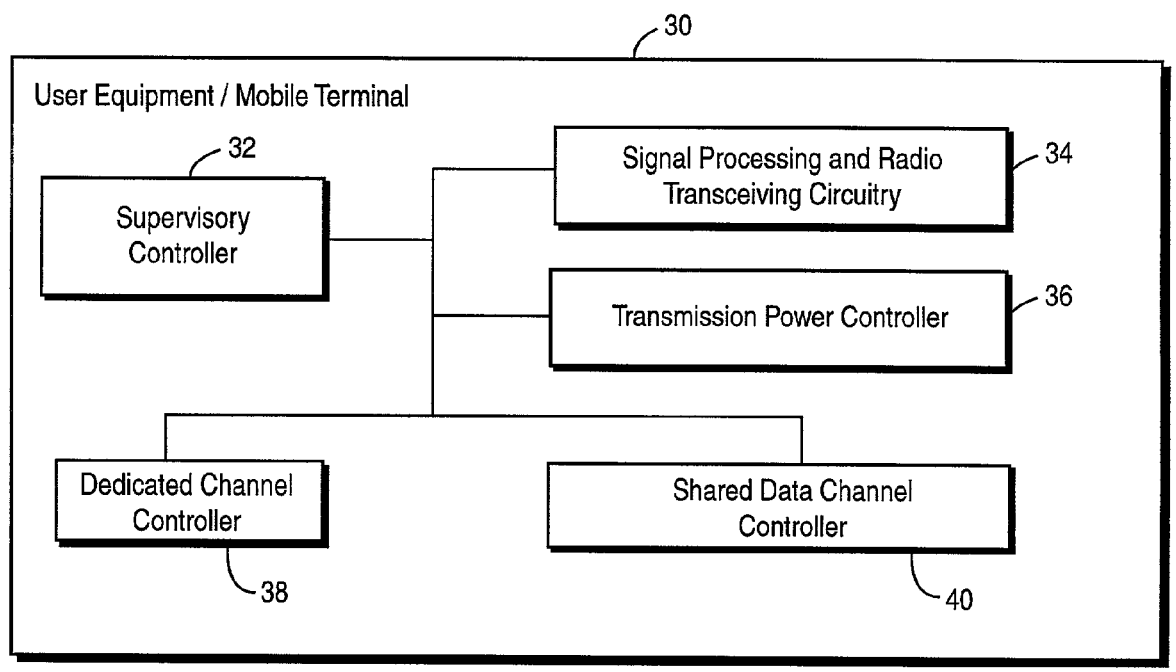
FIG. 10 illustrates a simplified function block diagram of a user equipment/mobile terminal.

FIG. 10 shows in function block format an example user equipment/mobile terminal 30. A supervisory controller 32 supervises the operation of signal processing and radio transceiving circuitry 34, transmit power control node 36, dedicated channel controller 38 and a shared data channel controller 42. These blocks in the user equipment 30 have functions similar to those in the radio base station 10 except that the dedicating channel controller 38 and the shared data channel controller 40 detect and decode the downlink transmissions transmitted from the base station 10. Once a positive indication is detected on the downlink dedicated signaling channel, the signaling processing and radio transceiving circuitry 34 detects and decodes data packets on the downlink shared data channel.

Figure 11:
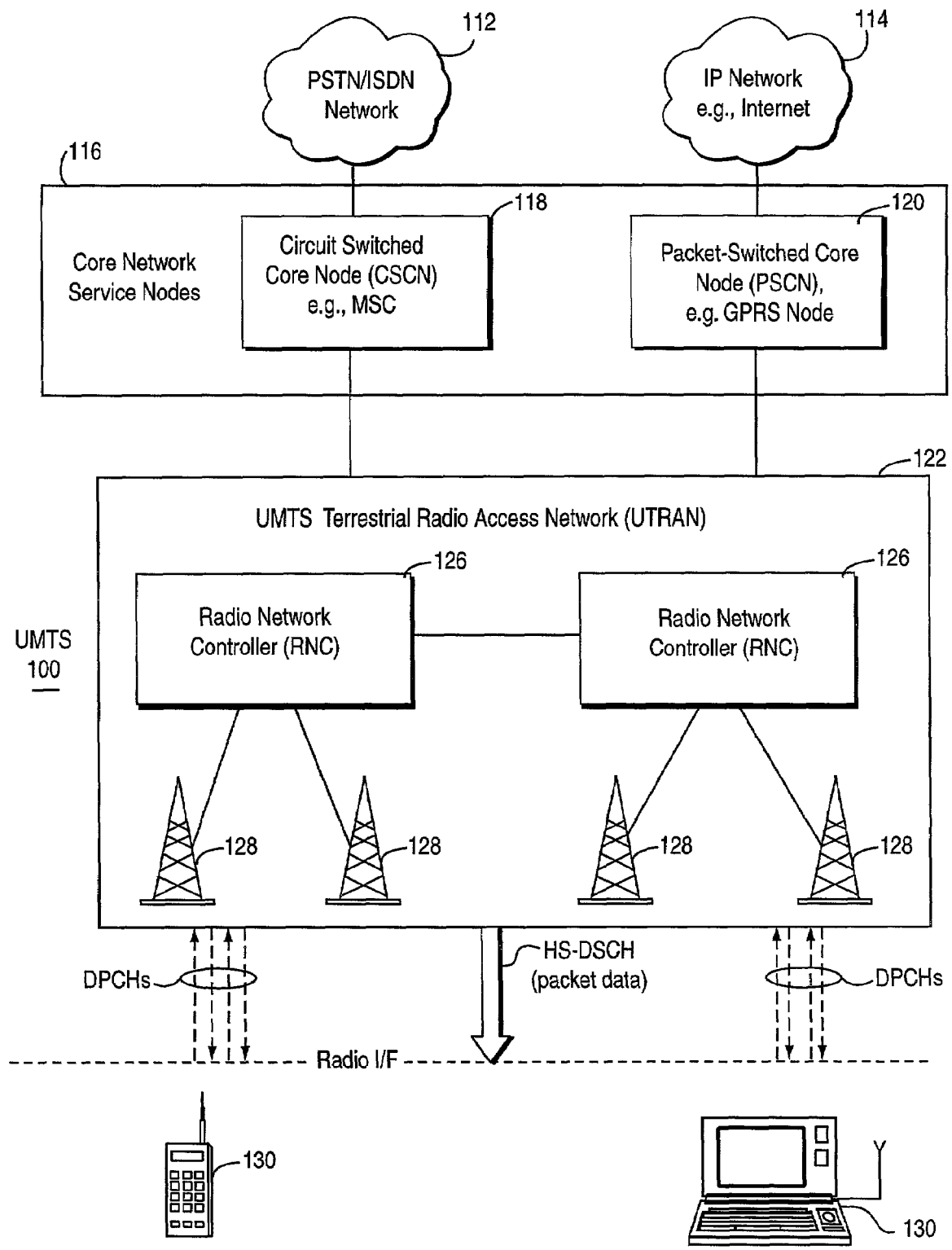
FIG. 11 illustrates a simplified function block diagram of an example cellular radio communications system in which the present invention may be advantageously employed.

One example, non-limiting embodiment in which the present invention may be employed is in the context of a Universal Mobile Telecommunications System (UMTS) 100 shown in FIG. 11. A representative, circuit-switched core network shown as cloud 112, may be for example the Public-Switched Telephone Network (PSTN) or the Integrated Services Digital Network (ISDN). A representative, packet-switched core network, shown as a cloud 114, may be for example an IP network like the Internet. Both core networks are coupled to corresponding core network service nodes 16. The PSTN/ISDN circuit-switched network 112 is connected to a circuit-switched service node shown as a Mobile Switching Center (MSC) 118 that provides circuit-switched services. The packet-switched network 114 is connected to a General Packet Radio Service (GPRS) node 120 tailored to provide packet-switched services.

Each of the core network service nodes 118 and 120 connect to a UMTS Terrestrial Radio Access Network (UTRAN) 124 that includes one or more radio network controllers (RNCs) 126. Each RNC is connected to a plurality of base stations (BS) 128 and to other RNCs in the UTRAN 122. Radio communications between the base stations and user equipment terminals 130 are by way of a radio interface. Radio access is based on Wideband CDMA (W-CDMA) with individual radio channels distinguished using spreading codes. Wideband CDMA provides wide radio bandwidth for multi-media services including packet data applications that have high data rate/bandwidth requirements. One scenario in which high speed data may need to be transmitted downlink from the UTRAN over the radio interface to a user equipment terminal is when the user equipment terminal requests information from a computer attached to the Internet, e.g., a website. A high speed-downlink shared channel (HS-DSCH) may be used for such downlink communications. Uplink and downlink dedicated channels (DPCH) are also shown.

Figure 12:
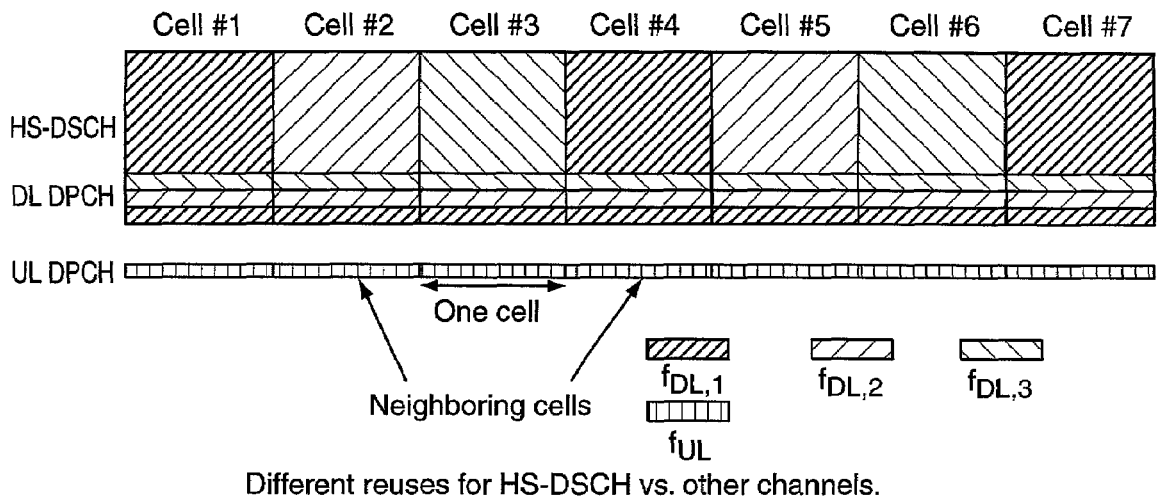
FIG. 12 is a diagram illustrating an example where different frequency reuses are deployed for shared and dedicated channels.

As illustrated and described in conjunction with FIG. 8, the present invention provides deployment of different frequency reuse values for different types of radio channels in a cellular communications system. In example implementation in the CDMA-based cellular system like that in FIG. 11, a frequency reuse greater than one is used for the high speed-downlink shared channel (HS-DSCH), and a frequency reuse of one is used for downlink (DL) and uplink (UL) dedicated channels DPCH. FIG. 12 illustrates an example implementation where different frequency reuses are deployed for shared and for dedicated channels. There are three downlink frequency carriers $f_{DL1}$, $f_{DL2}$, and $f_{DL3}$ and one uplink frequency carrier $f_{UL}$. For the HS-DSCH, each one of the three downlink frequency carriers is used only in every third cell corresponding to a frequency reuse of three. On the other hand, each downlink dedicated channel DL DPCH is carried on the same frequency carrier $f_{DL}$ in every cell corresponding to a frequency reuse of one. The uplink dedicated channel UF DPCH is carried on the same frequency carrier $f_{UL}$ in every cell as well, (a frequency reuse equal to one), although multiple uplink carriers could also be used in each cell.

Figure 13:
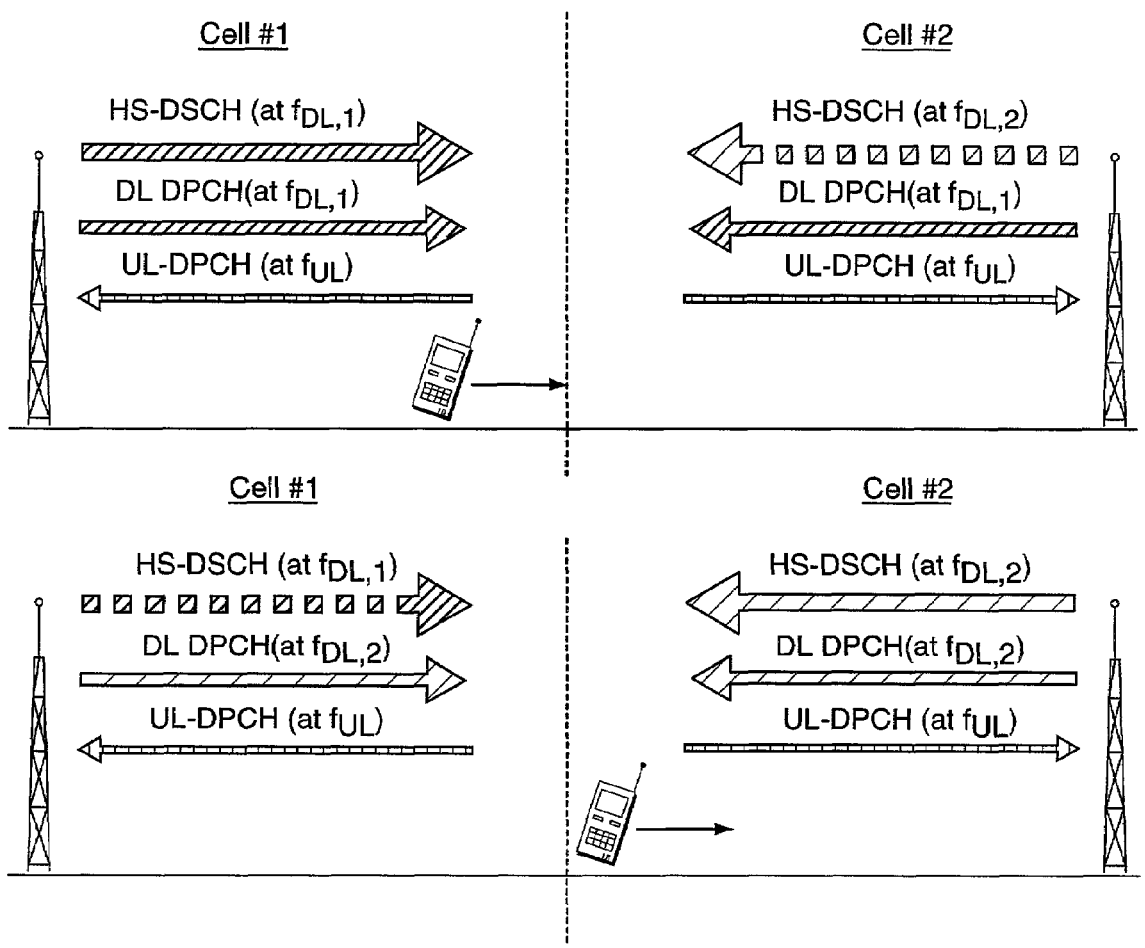
FIG. 13 illustrates a handover situation for the example in FIG. 12 where different frequency reuses are deployed for shared and dedicated channels.

FIG. 13 illustrates a soft handover situation where a mobile terminal is moving from cell #1 towards cell #2. The high speed downlink shared channel (HS-DSCH) is transmitted only on the carrier frequency $f_{DL,1}$ in cell #1 and only on the carrier frequency $f_{DL,2}$ in cell #2. On the other hand, a downlink dedicated channel DL DPCH associated with the mobile terminal may be transmitted on either carrier frequency $f_{DL,1}$ or $f_{DL,2}$ in both cells #1 and #2. When the mobile terminal is well within cell #1, i.e., it receives the HS-DSCH on its corresponding carrier frequency in cell #1, $f_{DL,1}$ (see the bold arrow), and the downlink channel dedicated to this mobile terminal is carried on frequency $f_{DL,1}$ as well. As the mobile terminal moves to the border between cells #1 and #2 and enters into soft handover with cell #2, the downlink dedicated channel DL DPCH in cell #2 associated with this mobile connection is carried on this same frequency $f_{DL,1}$ corresponding to cell #1. However, when the mobile terminal moves further into cell #2, as shown at the bottom of FIG. 13, it starts to receive the high speed downlink shared channel HS-DSCH on carrier frequency $f_{DL,2}$ corresponding to cell #2 (see the bold arrow). The downlink dedicated channel associated with this mobile connection is now carried on cell #2's dedicated downlink carrier frequency $f_{DL,2}$. Since there is only one uplink dedicated frequency in this example, FIG. 13 shows uplink communications for both cells on $f_{UL}$.

Figure 14:
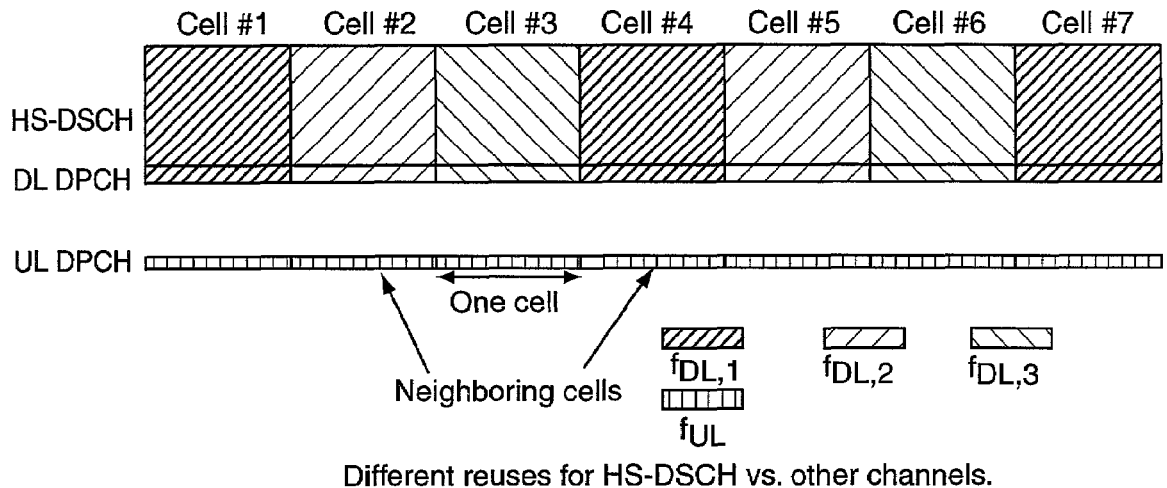
FIG. 14 is a diagram illustrating an example where different frequency reuses are deployed for downlink and uplink channels.
Figure 15:
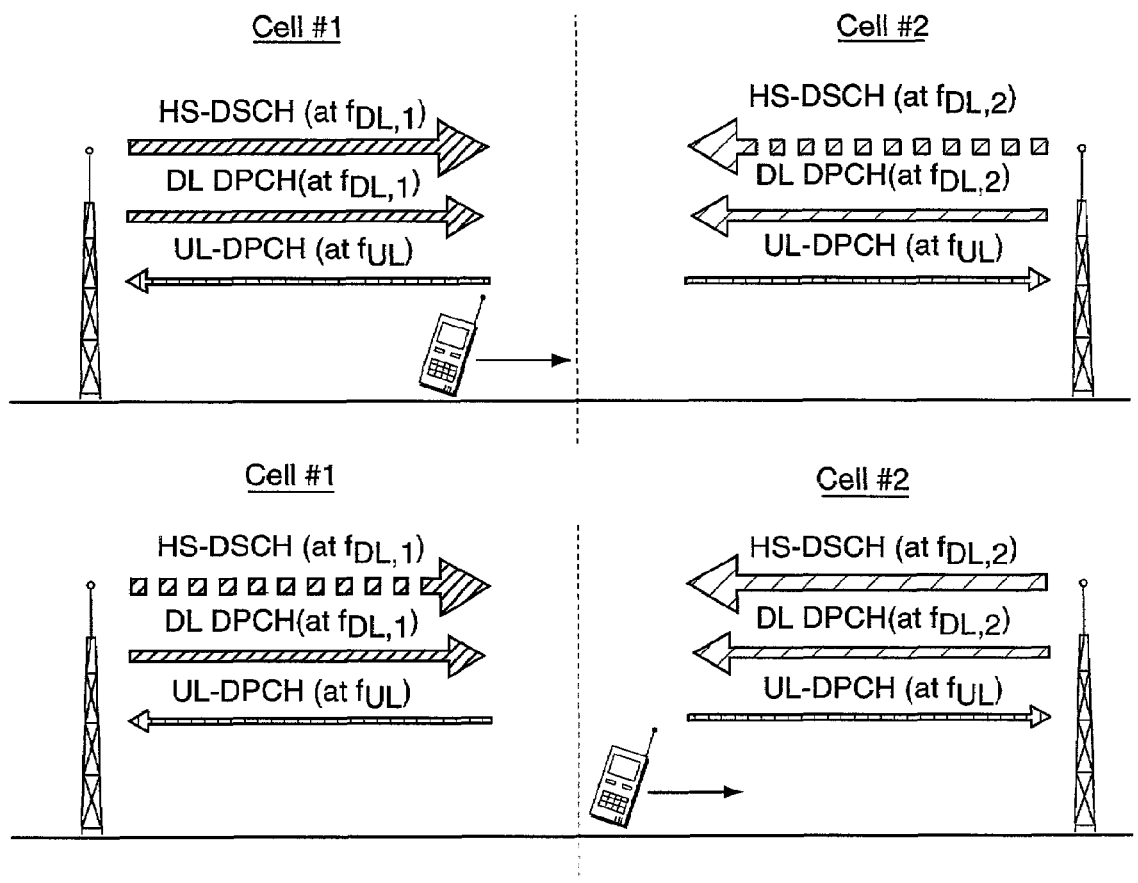
FIG. 15 illustrates a handover situation for the example in FIG. 14 where different frequency reuses are deployed for downlink and uplink channels.

Another example implementation is now described in conjunction with FIGS. 14 and 15 in which different frequency uses are deployed for downlink and uplink channel types. In FIG. 14, a frequency reuse greater than one is used for downlink channels which includes both shared channels like the HS-DSCH as well as dedicated channels such as the downlink DPCH. A frequency reuse equal to one is used only for the uplink channel corresponding to the UL DPCH in FIG. 14. Again, three downlink carriers ($f_{DL,1}$, $f_{DL,2}$, and $f_{DL,3}$) and one uplink carrier $f_{UL}$ are assumed for purpose of illustration only.

FIG. 15 illustrates a mobile terminal moving from cell #1 to cell #2 in a soft handover scenario. In these cells, the high speed downlink shared channel HS-DSCH is transmitted only on carrier frequency $f_{DL,1}$ in cell #1 and in only one carrier frequency $f_{DL,2}$ in cell #2. The same is also true for the illustrated dedicated downlink channel DL DPCH. On the other hand, uplink communications from the mobile terminal are communicated in all cells on $f_{UL}$. When the mobile terminal is well within cell #1, i.e., it receives the HS-DSCH, the DL DPCH on carrier frequency $f_{DL,1}$. As the mobile terminal approaches the cell border and enters into soft handover with cell #2, the downlink shared channel and downlink dedicated channel are eventually carried by the frequency carrier $f_{DL,2}$ for cell #2. See the switch of solid to dotted arrows. The uplink carrier remains the same $f_{UL}$.

The present invention achieves lower inter-cell interference and improved services for mobiles at cell borders by employing a frequency reuse greater than one for one or more channels such as the HS-DSCH channel described above. This is particularly beneficial because such a "big" downlink channel uses a significant amount of total downlink power transmitted from each cell. The reduction in interference between cells achieved by the present invention allows for higher data rates at the cell border. On the other hand, other types of channels, like dedicated channels, can still employ soft handover and receive the benefits thereof using a frequency reuse of one. If the second example implementation shown in FIGS. 14 and 15 is implemented where the downlink dedicated channel also employs a frequency reuse greater than one, the downlink inter-cell interference is further reduced. Soft handover may still be employed in one or more uplink dedicated channels. Therefore, each base station in the active set only has to transmit on a single frequency. However, for the second example implementation, the mobile terminal must be able to simultaneously receive downlink dedicated channels transmitting different carrier frequencies, e.g., $f_{DL,1}$ and $f_{DL,2}$, which means that a multi-carrier receiver must be employed.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. Although the present invention is described in relation to preferred example embodiments, it is to be understood that this disclosure is only illustrative and exemplary of the present invention. The example embodiments described above presume that considerable bandwidth would be regularly employed over the downlink. However, a frequency reuse greater than one may be employed, on uplink channels as well, if desired. Moreover, while the invention is described in the context of CDMA channels, the invention may be employed with other types of access channels. For example, the present invention may be applied to orthogonal frequency division multiplexing (OFDM) access channels. In a hybrid cellular system, the high speed downlink shared data channel might be an OFDM channel, while the dedicated channels might be CDMA type channels. Accordingly, it is intended that the invention be limited only by the scope of the claims appended hereto.

What is claimed is:

1. A method for use in cellular communications system having a first type of channel and a second type of channel different from the first type of channel, comprising:
   establishing a connection with a mobile radio in a first cell that includes the first type of channel being assigned a first frequency for a first uplink or downlink channel direction and the second type of channel being assigned a second different frequency for a second uplink or downlink channel direction, where the first and second uplink or downlink channel directions may be different or the same;
   associating a first frequency reuse for the first type of channel such that the first type of channel in the first uplink or downlink channel direction in a second cell adjacent to the first cell is assigned a third frequency different from the first and second frequencies, and
   associating a second frequency reuse for the second type of channel such that the second type of channel in the second uplink or downlink channel direction in the second cell adjacent to the first cell is assigned the second frequency,
   wherein one of the channels is a code division multiple access (CDMA) channel.

2. The method in claim 1, wherein the first type of channel is a shared channel and the second type of channel is a dedicated channel.

3. The method in claim 2, wherein the shared channel is a downlink channel and the second type of channel includes a downlink dedicated channel associated with the downlink shared channel.

4. The method in claim 2, wherein the second channel type also includes an uplink dedicated channel, associated with the downlink shared channel.

5. The method in claim 2, wherein the first channel type is a high speed downlink shared channel.

6. The method in claim 2 wherein the first channel type is a high speed uplink shared channel.

7. The method in claim 1, wherein the first type of channel is a downlink channel and the second type of channel is an uplink channel.

8. The method in claim 7, wherein the first type of channel includes multiple downlink channels and the second type of channel includes one uplink channel associated with the multiple downlink channels.

9. The method in claim 1, wherein the first type of channel is a channel not configured to use soft handover, and the second type of channel is a channel that is configured to use soft handover.

10. The method in claim 1, wherein the other of the first and second channels is an orthogonal frequency division multiplexing (OFDM) channel.

11. A control node for use in a cellular radio communications system in which a connection may be established with a mobile radio in a first cell that includes a first type of channel associated with a first frequency for a first uplink or downlink channel direction and a second different type of channel associated with a second different frequency for a second uplink or downlink channel direction, where the first and second uplink or downlink channel directions may be different or the same, comprising:
   a memory configured to store frequency reuse values for different types of channels including the first and second channel types, and a controller configured to associate a first frequency reuse with the first type of channel in the first cell and a second frequency reuse with the second type of channel in the first cell, wherein the controller is further configured to assign a third frequency different from the first and second frequencies to the first type of channel in the first uplink or downlink channel direction in a second cell adjacent to the first cell and to assign the second frequency to the second type of channel in the second uplink or downlink channel direction in the second cell adjacent to the first cell, and wherein one of the first and second types of channels is a code division multiple access (CDMA) channel.

12. The control node in claim 11, wherein the control node is a radio network controller coupled to one or more base stations.

13. The control node in claim 11, wherein the first channel is not a channel configured to use soft handover, and the second channel is a channel that is configured to use soft handover.

14. The control node in claim 11, wherein the first channel type is a shared channel and the second channel type is a dedicated channel.

15. The control node in claim 14, wherein the first channel type is a high speed downlink shared channel.

16. The control node in claim 11, wherein the first channel type is a high speed uplink shared channel.

17. The control node in claim 16, wherein the second type of channel includes a downlink dedicated channel.

18. The control node in claim 11, wherein the first type of channel includes a downlink channel and the second type of channel includes an uplink channel.

19. The control node in claim 18, wherein the first type of channel includes multiple downlink channels and the second type of channel includes one uplink channel.

20. The control node in claim 11, wherein the first frequency reuse is greater than the second frequency reuse.

21. The control node in claim 11, wherein the other of the first and second channels is an orthogonal frequency division multiplexing (OFDM) channel.

22. A communications node for use in code division multiple access (CDMA) cellular communications system where a connection established with a mobile radio in a first cell includes a first type of channel assigned to a first frequency for a first uplink or downlink channel direction and a second different type of channel assigned to a second different frequency for a second uplink or downlink channel direction, where the first and second uplink or downlink channel directions may be different or the same, comprising:

means for associating a first frequency reuse for the first CDMA channel type used in the first cell;

means for assigning a third frequency different from the first and second frequencies to the first type of channel in the first uplink or downlink channel direction in a second cell adjacent to the first cell, means for associating a second frequency reuse for the second CDMA channel type used in the cell; and means for assigning the second frequency in the second uplink or downlink channel direction to the second type of channel in the second cell.

23. The communications node in claim 22, wherein the first type of CDMA channel is a shared channel and the second type of CDMA channel is a dedicated channel.

24. The communications node in claim 23, wherein the shared channel is a downlink channel and the second type of channel includes a downlink dedicated channel.

25. The method in claim 24, wherein the second type of CDMA channel also includes an uplink dedicated channel.

26. The communications node in claim 22, wherein the first type of CDMA channel is a high speed downlink shared channel and the second type of CDMA channel is a high speed uplink shared channel.

27. The communications node in claim 26, wherein the first type of CDMA channel includes multiple downlink channels and the second type of CDMA channel includes an uplink channel.

28. A mobile radio node for use in a cellular radio communications system in which a connection may be established with the mobile radio node in a first cell that includes a first type of channel assigned to a first frequency in a first uplink or downlink channel direction and a second type of channel assigned to a second different frequency for a second uplink or downlink channel direction, where the first and second uplink or downlink channel directions may be different or the same, comprising:

circuitry configured to support a communication in the first cell using first type of channel assigned to the first frequency in the first uplink or downlink channel direction and the second type of channel assigned to the second different frequency for the second uplink or downlink channel direction, wherein the circuitry is further configured to support a communication in a second different cell using the first type of channel assigned to a third different frequency in the first uplink or downlink channel direction and the second type of channel assigned to the second different frequency for the second uplink or downlink channel direction.

29. The mobile radio node in claim 28, comprising:

handover circuitry configured to perform a first type of handover of the communication carried on the first type of channel and to perform a second type of handover of the communication carried on the second type of channel, wherein at least one of the first and second types of channels is a code division multiple access (CDMA) channel.

30. The mobile radio node in claim 28, wherein the first type of channel has a first frequency reuse and the second type of channel a second different frequency reuse.

* * * * *